US010218045B2

(12) United States Patent
Laighton et al.

(10) Patent No.: US 10,218,045 B2
(45) Date of Patent: Feb. 26, 2019

(54) SERIALLY CONNECTED TRANSMISSION LINE SECTIONS EACH HAVING A CONDUCTIVE SHIELD MEMBER OVERLYING A PORTION OF A STRIP CONDUCTOR

(71) Applicant: Raytheon Company, Waltham, MA (US)

(72) Inventors: Christopher M. Laighton, Boxborough, MA (US); Susan C. Trulli, Lexington, MA (US); Elicia K. Harper, Chelsea, MA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 15/615,984

(22) Filed: Jun. 7, 2017

(65) Prior Publication Data

US 2018/0358675 A1 Dec. 13, 2018

(51) Int. Cl.
*H01P 3/00* (2006.01)
*H01P 3/02* (2006.01)
*G02F 1/225* (2006.01)

(52) U.S. Cl.
CPC .............. *H01P 3/006* (2013.01); *H01P 3/003* (2013.01); *H01P 3/026* (2013.01); *G02F 1/2257* (2013.01)

(58) Field of Classification Search
CPC ............. H01P 3/003; H01P 3/006; H01P 3/06
(Continued)

(56) References Cited

U.S. PATENT DOCUMENTS 4,801,905 A * 1/1989 Becker .................... H01P 3/081 174/117 FF
5,194,833 A * 3/1993 Dougherty et al. .... H01P 3/003 333/246

(Continued)

FOREIGN PATENT DOCUMENTS

| | | |
|---|---|---|
| CN | 106301230 A | 1/2017 |
| JP | H01177201 | 7/1989 |
| JP | 2009124044 | 6/2009 |

OTHER PUBLICATIONS

Shaowu Huang, Kai Xiao, Xiaoning Ye, Improve Electrical Performance of Interconnects Using Inkjet Printing, IEEE, 2016, pp. 256-260 (5 pages).

(Continued)

*Primary Examiner* — Benny T Lee
(74) *Attorney, Agent, or Firm* — Daly, Crowley, Mofford & Durkee, LLP

(57) ABSTRACT

A microwave transmission line structure having a pair of ground strip conductors on a surface of a dielectric substrate structure. A signal strip conductor is disposed on the surface of the dielectric substrate structure between the pair of ground strip conductors. A solid dielectric layer is disposed over: the signal strip conductor; the upper surface of the dielectric substrate structure between sides of each one of the ground strip conductors; and the signal strip conductor. An electrically conductive shield member is disposed on the solid dielectric layer and on, and in direct contact with, upper surfaces of the pair of ground strip conductors. The structure is used on each one of a plurality of proximate microwave transmission lines formed on the substrate structure to electrically isolate the transmission line.

26 Claims, 17 Drawing Sheets

(58) Field of Classification Search
USPC .......................................................... 333/238
See application file for complete search history.

(56) References Cited

U.S. PATENT DOCUMENTS

| | | | | |
|---|---|---|---|---|
| 6,674,347 | B1 | 1/2004 | Maruhashi et al. | |
| 6,762,494 | B1 | 7/2004 | Fazelpour et al. | |
| 7,842,886 | B2 * | 11/2010 | Kobayashi et al. ...... | H01P 3/08<br>174/117 F |
| 8,344,819 | B2 * | 1/2013 | Karikalan ............ | H05K 1/0219<br>333/1 |
| 9,570,786 | B2 | 2/2017 | Kato | |
| 2005/0156693 | A1 * | 7/2005 | Dove et al. ............. | H01P 3/085<br>333/243 |
| 2016/0197391 | A1 | 7/2016 | Li et al. | |
| 2018/0131066 | A1 * | 5/2018 | Laighton et al. ....... | H01P 3/003 |

OTHER PUBLICATIONS

Notification of Transmittal of the International Search Report and Written Opinion of the ISA dated Oct. 12, 2018 for International Application No. PCT/US2018/034992; 1 Page.
International Search Report dated Oct. 12, 2018 for International Application No. PCT/US2018/034992; 5 Pages.
Written Opinion of the ISA dated Oct. 12, 2018 for International Application No. PCT/US2018/034992; 14 Pages.
Simons; "Conductor-Backed Coplanar Waveguide"; Coplanar Waveguide Circuits, Components, and Systems; John Wiley & Sons; Chapter 3; pp. 87-111; Jan. 1, 2001; 25 Pages.
Simons; "Coplanar Waveguide Discontinuities and Circuit Elements"; Coplanar Waveguide Circuits, Components, and Systems; John Wiley & Sons; Chapter 9; pp. 237-287; Jan. 1, 2001; 51 Pages.

* cited by examiner

SERIALLY CONNECTED TRANSMISSION LINE SECTIONS EACH HAVING A CONDUCTIVE SHIELD MEMBER OVERLYING A PORTION OF A STRIP CONDUCTOR

TECHNICAL FIELD

This disclosure relates generally to microwave transmission lines and more particularly to shielded microwave transmission lines.

BACKGROUND

As is known in the art, in many applications it is required to provide a plurality of microwave transmission lines to electrically interconnect electrical devices. One such application is in interconnecting electrical devices formed as a Monolithic Microwave Integrated Circuit (MIMIC) as shown in FIG. 1. The microwave transmission lines may be: a plurality of coplanar waveguide transmission lines, as shown in FIGS. 1A' and 1A"; and where the signal strip conductor (FIG. 1A") is disposed between a pair of ground strip conductors (FIG. 1A") all formed of the upper surface of a dielectric (FIG. 1A') for a monolithic microwave integrated circuit (MMIC) and the electric field, here represented by the arrow, vector, (e) (FIG. 1A') is between the signal strip conductor and the pair of ground strip conductors; or a plurality of microstrip transmission lines, as shown in FIGS. 1B' and 1B", where a signal strip conductor (FIG. 1B") on an upper surface of a dielectric is separated by an underlying ground plane conductor (FIG. 1B') on a bottom surface of the dielectric and the electric field, e, as shown in FIG. 1B', is through the dielectric between the signal strip conductor and the dielectric.

In order to maximize the utilization of the surface of the MMIC for various active and passive devices used in the MMIC and interconnected by these microwave transmission lines it is generally required that the spacing, X, (FIG. 1) between these microwave transmission lines be minimized yet still have these proximate transmission lines electrically shielded one from another.

One technique suggested to improve isolation between a pair of microstrip transmission lines is described in a paper entitled "Improved Electrical Performance of Interconnects Using Inkjet Printing" by S. Huang, K. Xiao and X. Ye, 2016 IEEE International Symposium on Electromagnetic Compatibility (EMC), Ottawa, ON, 2016, pp. 256-260 shown in FIG. 2A. Here absorbing material is printed over each of the strip conductors and between the pair of strip conductors. A technique used to improve isolation for a pair of CPW transmission lines is shown in FIG. 2B. Here a pair of CPW transmission lines each has a signal strip conductor (S) disposed between a pair of ground strip conductors (G) on the upper surface of a dielectric substrate. Here, each one of the CPW transmission lines includes electrically conductive vias (V) passing through the dielectric to electrically connect the ground strip conductors (G) to a ground plane conductor (GP) on the bottom of the dielectric substrate. The shielding between the pair of CPW transmission lines is provided by bond wires or ribbons to form wire bonds (WB) suspended over the signal strip conductor having ends thereof bonded to the pair of ground strip conductors and spaced apart less than typically every ⅛ wavelength of the nominal operating wavelength of the microwave transmission line structures to form a Radio Frequency (RF) cage, as shown.

SUMMARY OF THE INVENTION

In accordance with the present disclosure, a microwave transmission line structure is provided having a pair of ground strip conductors on a surface of a dielectric substrate structure. A signal strip conductor is disposed on the surface of the dielectric substrate structure between the pair of ground strip conductors. A solid dielectric layer is disposed over: the signal strip conductor; the upper surface of the dielectric substrate structure between sides of each one of the ground strip conductors; and the signal strip conductor. An electrically conductive shield member is disposed on the solid dielectric layer and on, and in direct contact with, upper surfaces of the pair of ground strip conductors. The structure is used on each one of a plurality of proximate microwave transmission lines formed on the substrate structure to electrically isolate the transmission line.

In one embodiment, the electrically conductive shield member is disposed over a first portion of the strip conductor, a second portion of the signal strip conductor being uncovered by the electrically conductive shield member and wherein the first portion of the signal strip conductor is wider than the second portion of the signal strip conductor.

In one embodiment, a ground plane conductor is disposed on a bottom surface of the dielectric substrate structure and the electrically conductive shield member is electrically connected to the ground plane conductor.

In one embodiment, a microwave transmission line structure includes: a pair of ground strip conductors on a surface of a dielectric substrate structure; a signal strip conductor disposed on the surface of the dielectric substrate structure between the pair of ground strip conductors; a solid dielectric layer disposed over: the signal strip conductor; the upper surface of the dielectric substrate structure between sides of each one of the ground strip conductors; and the signal strip conductor. A plurality of electrically conductive shield members is disposed along the microwave transmission line structure, each one of the plurality of electrically conductive shield members being disposed on the solid dielectric layer and on, and in direct contact with, upper surfaces of the pair of ground strip conductors, In one embodiment, a microwave transmission line structure is provided having a plurality of serially connected microwave transmission line structure sections. Each one of the sections includes: a pair of ground strip conductors on a surface of a dielectric substrate structure; a signal strip conductor disposed on the surface of the dielectric substrate structure between the pair of ground strip conductors; a solid dielectric layer disposed over: the signal strip conductor; the upper surface of the dielectric substrate structure between sides of each one of the ground strip conductors; and the signal strip conductor. An electrically conductive shield member is disposed on the solid dielectric layer and on, and in direct contact with, upper surfaces of the pair of ground strip conductors. The electrically conductive shield member is disposed over a first portion of the strip conductor, second portions of the signal strip conductor being uncovered by the electrically conductive shield member, the first portion of the strip conductor being disposed between the second portions of the signal strip conductor. The first portion of the signal strip conductor is wider than the second portion of the signal strip conductor.

In one embodiment, each one of the one of the plurality of microwave transmission line structure sections has the same predetermined input impedance.

In one embodiment, the plurality of microwave transmission line structure sections are spaced at predetermined positions along the microwave transmission line structure.

In one embodiment, the solid dielectric layer has outer sides disposed over the upper surfaces of the pair of ground strip conductors and wherein the electrically conductive shield member is disposed on the outer sides of the solid dielectric layer.

The details of one or more embodiments of the disclosure are set forth in the accompanying drawings and the description below. Other features, objects, and advantages of the disclosure will be apparent from the description and drawings, and from the claims.

BRIEF DESCRIPTION OF THE DRAWINGS

FIG. 4C' is a cross sectional views of the exemplary one of a plurality of serially connected sections of a microstrip transmission line section according to an alternative embodiment of the disclosure;

Like reference symbols in the various drawings indicate like elements.

DETAILED DESCRIPTION OF THE INVENTION

Figure 1:
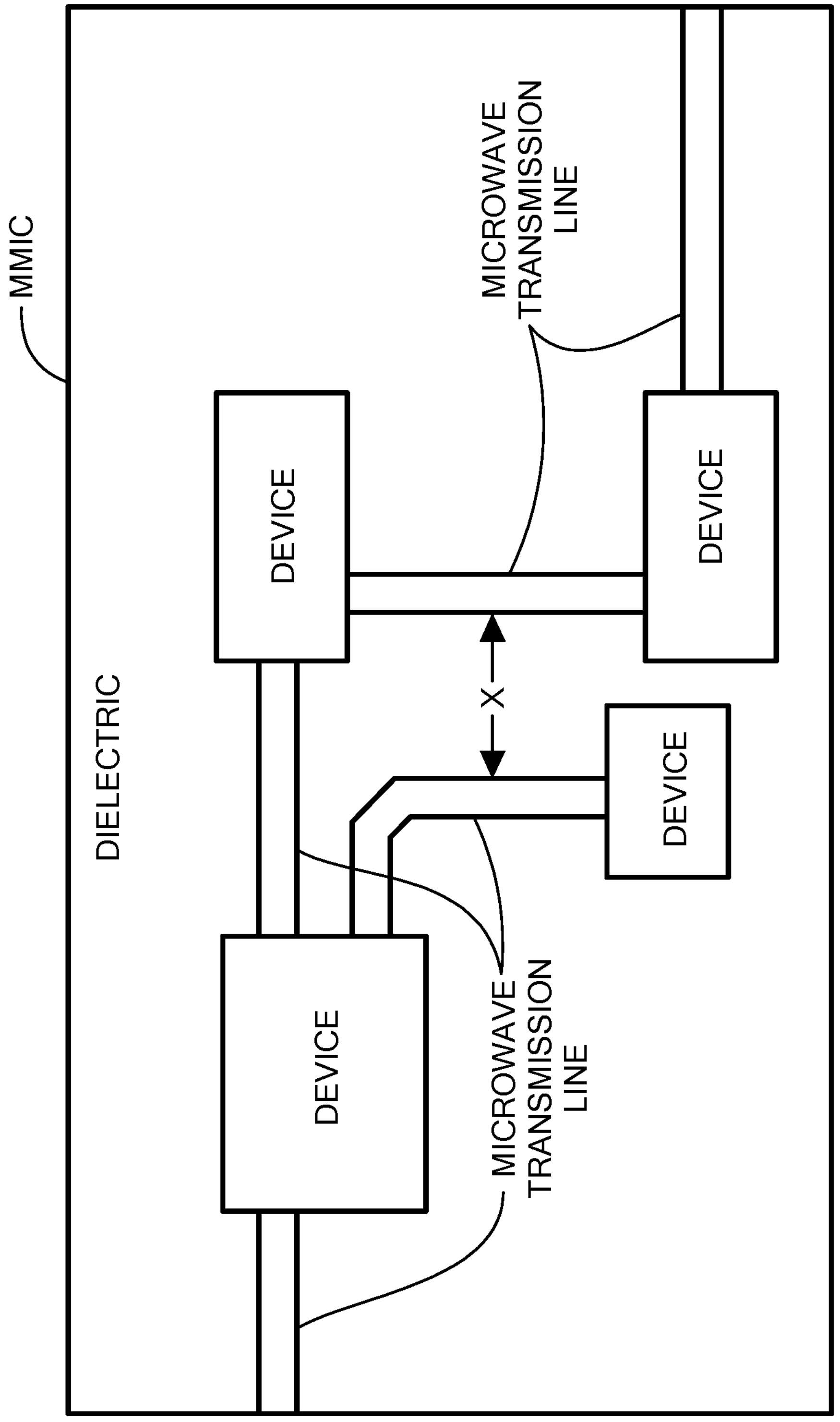
FIG. 1 PRIOR ART
FIG. 1 plan view of a Monolithic Microwave Integrated Circuit (MMIC) having a plurality of devices interconnected with microwave transmission line structures according to the PRIOR ART.
Figure 1A:
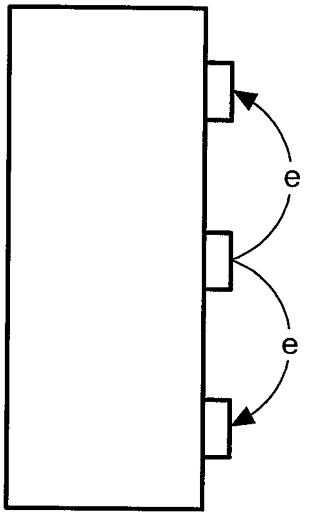
FIG. 1A' PRIOR ART
FIGS. 1A' and 1A" are cross sectional and plan view sketches, respectively, of a Coplanar Waveguide (CPW) transmission line structure used in the MMIC of FIG. 1 for use as the microwave transmission line structure to interconnect the plurality of devices therein according to the PRIOR ART, such cross-section being taken along line 1A'-1A' in FIG. 1A"
Figure 1A:
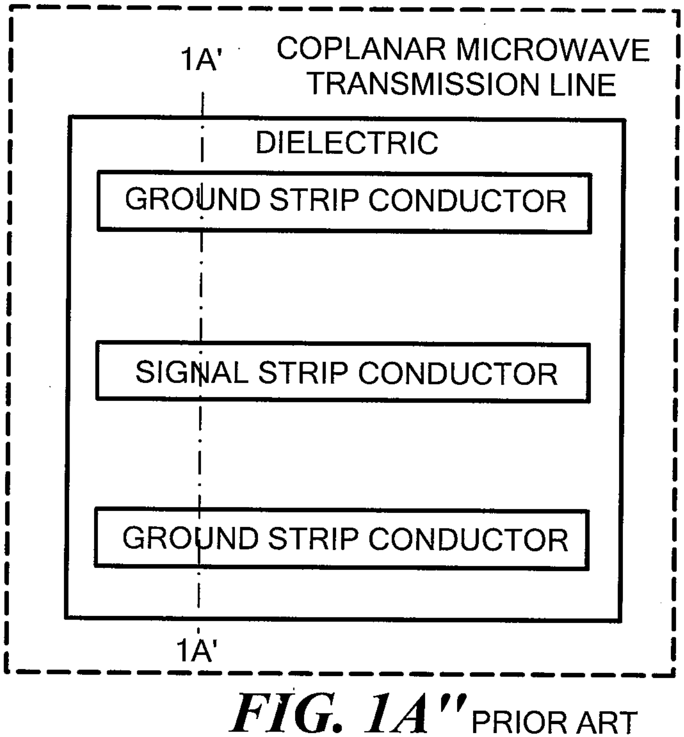
FIG. 1A'' PRIOR ART
Figure 1B:
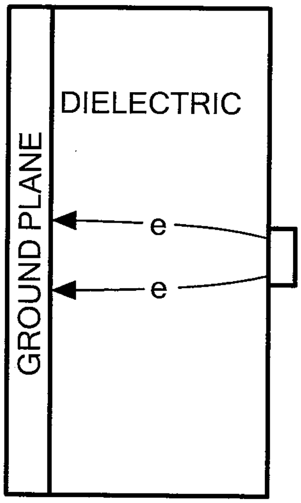
FIG. 1B' PRIOR ART
FIGS. 1B' and 1B" are cross sectional and plan view sketches, respectively, of a microstrip transmission line structure used in the MIMIC of FIG. 1 for use as the microwave transmission line structure to interconnect the plurality of devices therein according to the PRIOR ART, such cross-sections being taken along line 1B'-1B' in FIG. 1B"
Figure 1B:
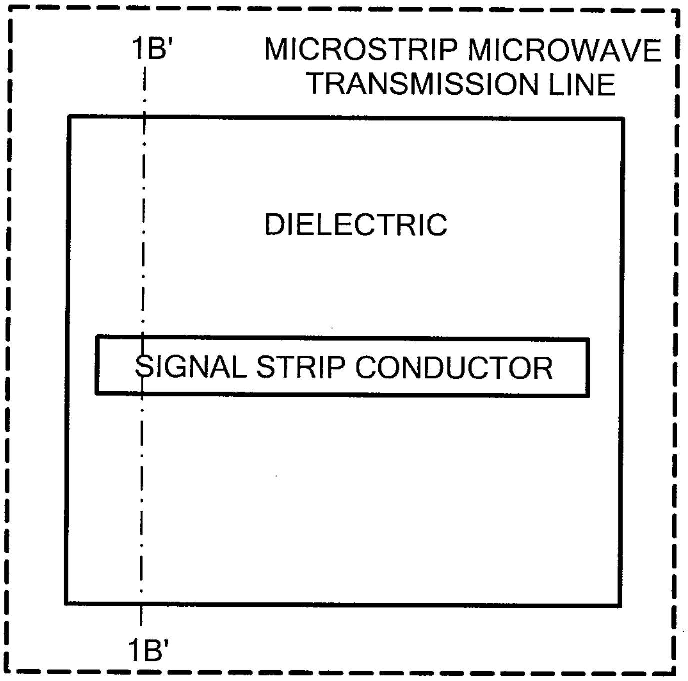
FIG. 1B'' PRIOR ART
Figure 2A:
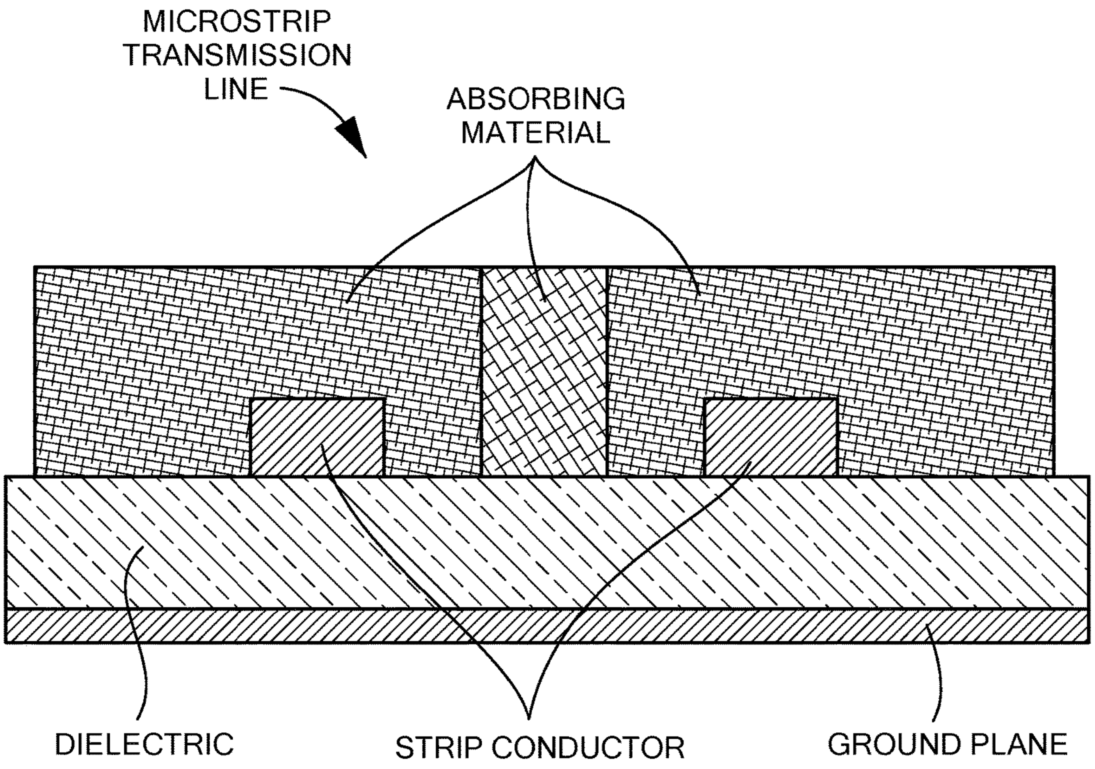
FIG. 2A PRIOR ART
FIG. 2A is a perspective view sketch of a pair of microstrip transmission lines electrically isolated one from the other by printed absorbing material according to the PRIOR ART.
Figure 2B:
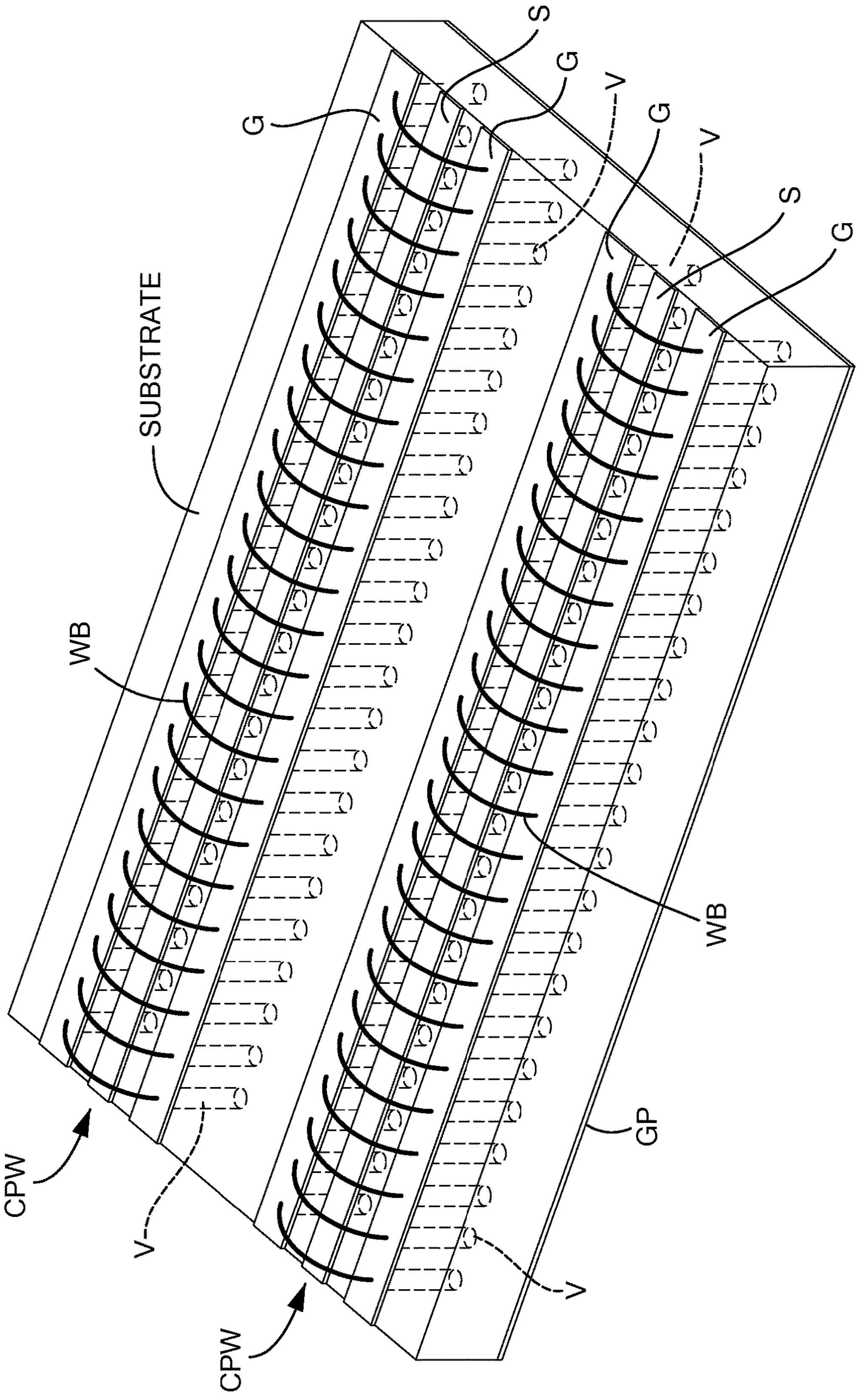
FIG. 2B PRIOR ART
FIG. 2B is a perspective view sketch of a pair of CPW transmission line structures electrically isolated one from the other by wire bonds according to the PRIOR ART.
Figure 3:
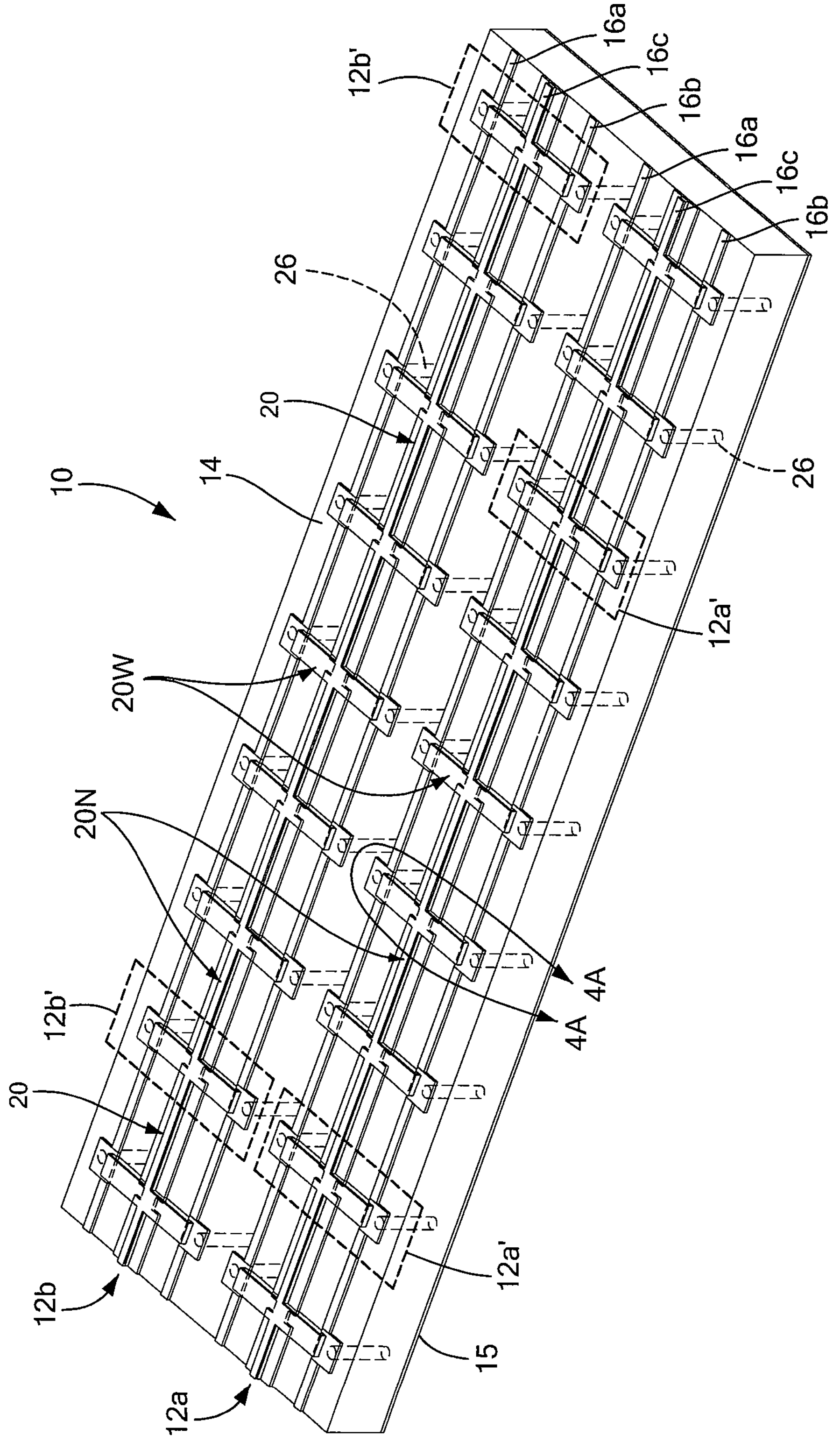
FIG. 3 is a perspective view sketch of a pair of microstrip transmission line structures electrically isolated one from the other according to the disclosure.
Figure 4A:
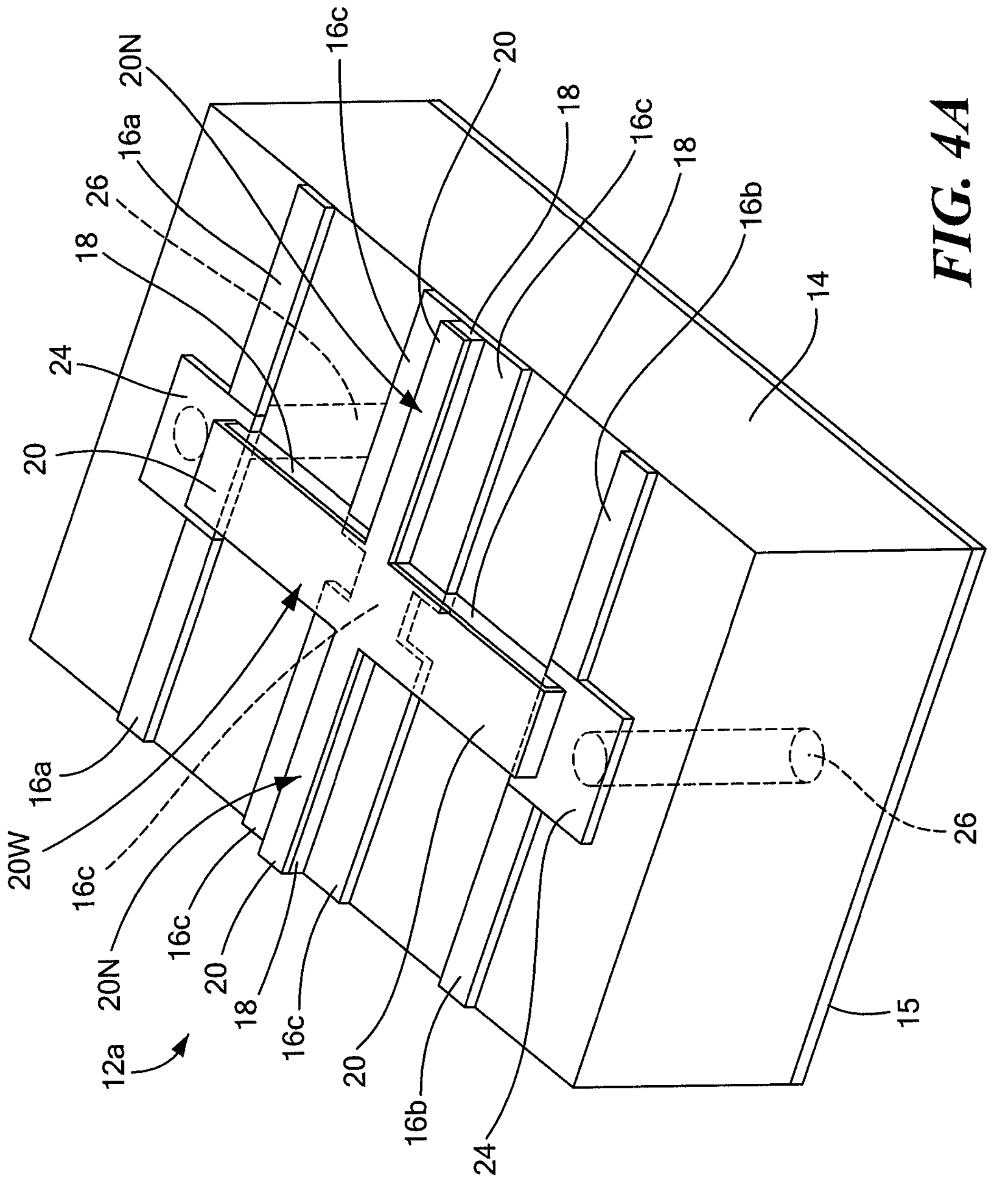
FIG. 4A is an enlarged, perspective view sketch of an exemplary one of a plurality of serially connected microstrip transmission line structure sections of one pair of microstrip transmission line structures of FIG. 3, such portion being enclosed by the arrow 4A-4A in FIG. 3.
Figure 4E:
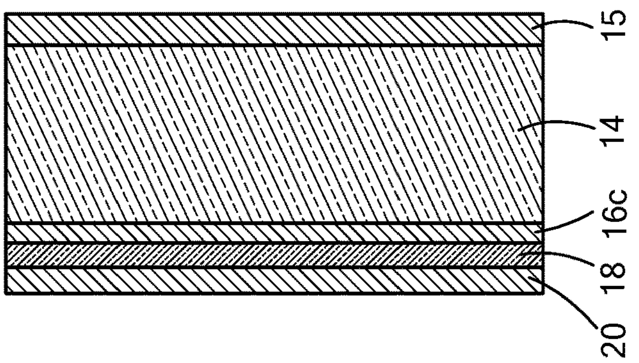
FIGS. 4C, 4D and 4E are cross sectional views of the exemplary one of a plurality of serially connected sections of the transmission line sections of FIG. 4A, such cross sectional views being taken along lines 4C-4C, 4D-4D and 4E-4E, respectively in FIG. 4B.
Figure 4B:
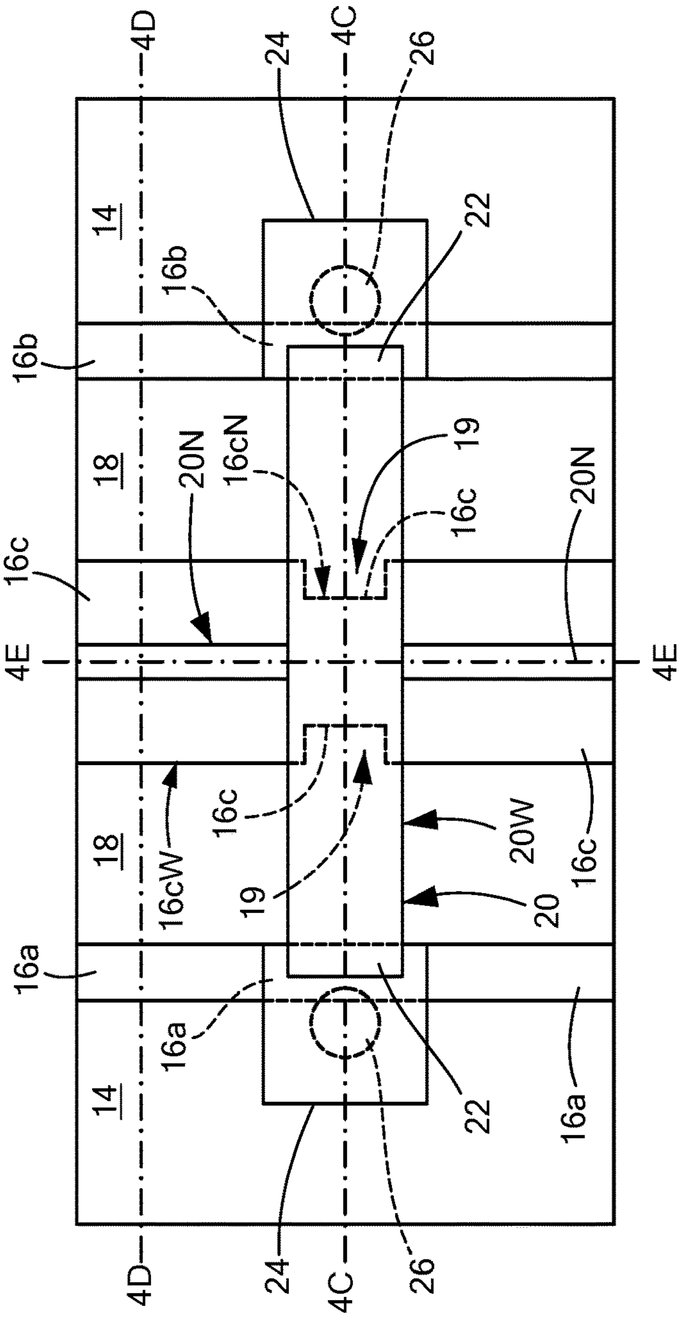
FIG. 4B is a plan view of the exemplary one of a plurality of serially connected sections of the transmission line sections of FIG. 4A according to the disclosure.
Figure 4C:
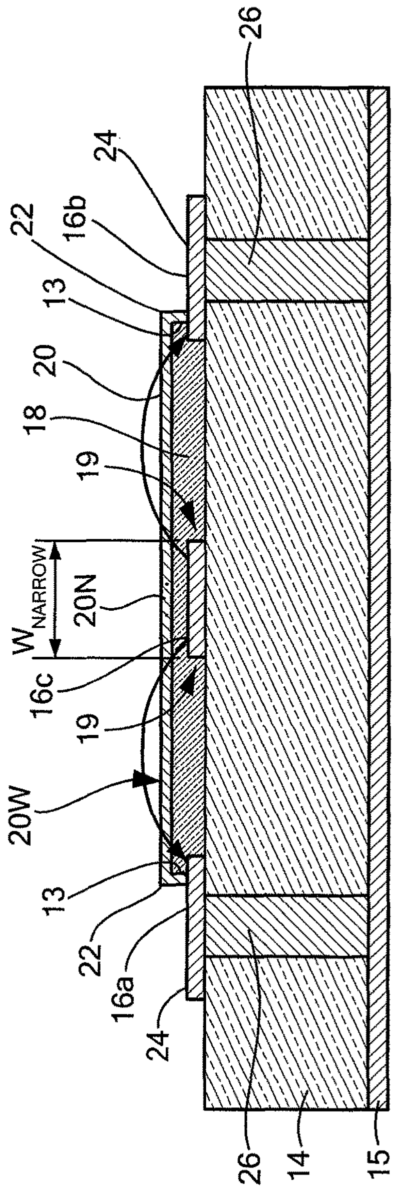

Referring now to FIG. 3, a structure 10 is shown having a plurality of, here two, microwave transmission line structures 12*a*, 12*b*, here for example, microstrip transmission line structures, on a dielectric substrate structure 14; an enlarged portion of the structure 10 being shown in FIGS. 4A-4E. A ground plane conductor 15 is disposed on a bottom surface of the dielectric substrate structure 14. Each one of the microwave transmission line structures 12*a*, 12*b* includes: a pair of elongated ground strip conductors 16*a*, 16*b*, disposed on a upper surface of the dielectric substrate structure 14; an elongated signal strip conductor 16*c* disposed on the upper surface of the dielectric substrate structure 14 between the pair of ground strip conductors 16*a*, 16*b*; a solid dielectric layer 18 (FIG. 4A), disposed over: (a) the signal strip conductor 16*c*; (b) the ground strip conductors 16*a*, 16*b*; and (c) a portion of the upper surface of the dielectric substrate structure 14 between sides of each one of the ground strip conductors 16*a*, 16*b* and the signal strip conductor 16*c* (it being noted that here, for example, the solid dielectric layer 18 overlaps portions of the ground strip conductors 16*a*, 16*b*); and, (c) an electrically conductive shield member 20 disposed on the solid dielectric layer 18 including outer sides 13 (FIG. 4C) of the solid dielectric layer 18. The electrically conductive shield member 20 has a plurality of wide portions 20W, spaced along a longitudinal axis of the microwave transmission line structure, interconnected connected by narrow portions 20N are spaced one from another a predetermined distance along the longitudinal axis of the microwave transmission line structure typically every ⅛ wavelength of the nominal operating wavelength of the microwave transmission line structures 12*a*, 12*b* (or closer). The wide portions 20W here have: ends or outer sides 22 (FIGS. 4B, 4C and 4C') electrically connected to the pair of ground strip conductors 16*a*, 16*b* through electrically conductive pads 24, as shown in FIGS. 4A, 4B, 4C and 4C') (it should be understood that the pads 24 are part of the ground strip conductors 16*a*, 16*b* and may be formed at the same time as the ground strip conductors 16*a*, 16*b* are formed); and portion between the ends 22 disposed over, and electrically insulated from, the signal strip conductor 16*c* by the solid dielectric layer 18. More particularly, the wide portions 20W of the electrically conductive shield member 20 are disposed over correspondingly spaced narrow portions 16*c*N (FIG. 4B) of the signal strip conductor 16*c* and the narrow portions 20N of the electrically conductive shield member 20 are disposed over second portions 16*c*W (FIG. 4B) of the signal strip conductor 16*c*. It should be understood that the portions 20N and 20W may be the same width. The structure 10 also includes a plurality of pairs of electrically conductive vias 26 (FIGS. 4A, 4B, and 4C) spaced, typically every ⅛ wavelength of the nominal operating wavelength of the microwave transmission line structures 12*a*, 12*b* (or closer), along a longitudinal axis of the microwave transmission line structures 12*a*, 12*b*, each one of the pairs of electrically conductive vias 26 passing from a corresponding one of the conductive pads 24, through the underlying portions of the dielectric substrate structure 14 to the ground plane conductor 15 to thereby electrically connect the electrically conductive shield member 20 and the ground strip conductors 16*a*, 16*b* to the ground plane conductor 15. It should be understood that the electrically conductive shield member 20 and the ground strip conductors 16*a*, 16*b* may be connected to the ground plane conductor 15 by conductive members 17*a*, 17*b* (FIG. 4C') printed or otherwise formed on the sides of the substrate 14 between and the ground plane conductor 15 and the pads 24, here shown formed along with the ground strip conductors 16*a*, 16*b* as mentioned above. It is also noted that an electrically conductive shield member 20 is disposed on the solid dielectric layer 18 and on, and in direct contact with, upper surfaces of the pair of ground strip conductors 16*a*, 16*b*. It is further noted that the electrically conductive shield member 20 is disposed on the outer sides 13 (FIG. 4C) of the solid dielectric layer 18.

Thus, each one of the microwave transmission line structures 12*a*, 12*b* includes a series of identical, electrically connected microwave transmission line structure sections, 12*a*', 12*b*'; each one of the one of the plurality of microwave transmission line structure sections 12*a*', 12*b*' having the same predetermined input impedance, here for example fifty ohms; an exemplary one thereof, here 12*a* being shown in more detail FIG. 4A.

Referring to FIGS. 4A-4E, as noted above, the first portion 16*c*N (FIG. 4B) of the signal strip conductor are narrower than the second portions 16*c*W (FIG. 4B) of the signal strip conductor 16*c*, for reasons to be described below. It is also noted that the narrow portion 20N of the electrically conductive shield 20 (FIGS. 4A, 4B, 4C, and 4E), is along the longitudinal axis of the signal strip conductor 16*c* and the wide portion 20W is perpendicular to the narrow portion 20N and is disposed over narrow portion 16*c*N of the signal strip conductor 16*c*; here the narrow portion 16*c*N being formed by notches 19 (FIGS. 4B and 4C) formed in the sidewalls of the signal strip conductor 16*c*. Thus, referring to FIG. 4C, a computer model is made of a structure having a cross section shown in FIG. 4C (without being attached to a structure having the cross section shown in FIG. 4D) to determine the width $W_{WIDE}$, as shown in FIG. 4B, is required to have an input impedance of 50 ohms. Next, a computer model is made of a structure having a cross section shown in FIG. 4B (without being attached to a structure having the cross section shown in FIG. 4C) to determine the width $W_{NARROW}$ (FIG. 4C') required to have an input impedance of 50 ohms. Thus, the microwave transmission line structure sections 12*a*', 12*b*' shown in FIGS. 4A-4E will have, in this example, an input impedance of 50 ohms and, therefore each one of the microwave transmission line structures 12*a*, 12*b* will have, in this example, an input impedance of 50 ohms.

The microwave transmission lines structures 12*a*, 12*b* are fabricated in a sequence of the following process steps shown in FIGS. 5A-5D: After forming the electrically conductive pads 24 (FIGS. 5A and 5B) and ground plane conductor 15 (FIGS. 5A and 5B), on dielectric substrate 14 (FIGS. 5A and 5B) and, vias 26 (FIGS. 5A and 5B) through the dielectric substrate 14, using any conventional photolithographic-etching process to form the structure shown in FIG. 5A, the pair of ground strip conductors 16*a*, 16*b* and signal strip conductor 16*c* (FIGS. 5B, 5C and 5D) are formed on the upper surface of the dielectric substrate structure 14 using conventional photolithographic-etching processing to form the structure shown in FIG. 5B. It should be understood that 3D printing or additive manufacturing may be used.

Figure 4D:
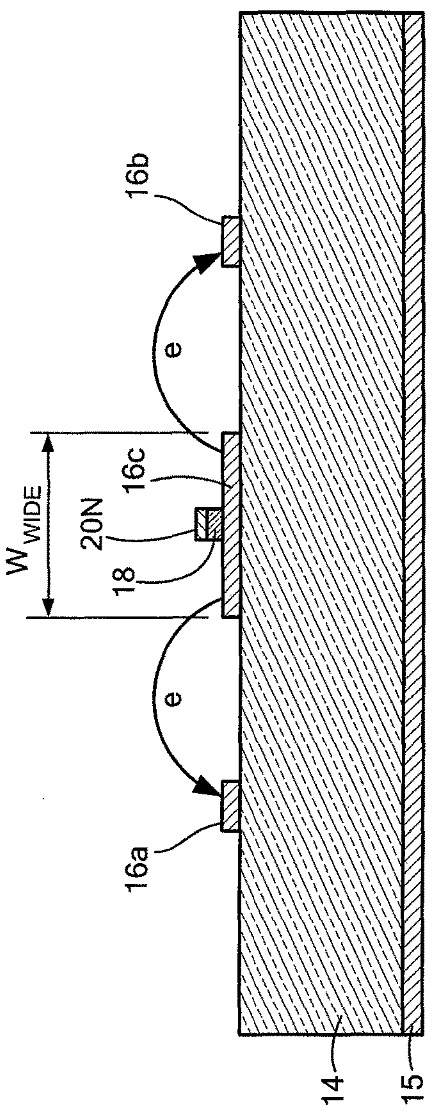
Figure 4C:
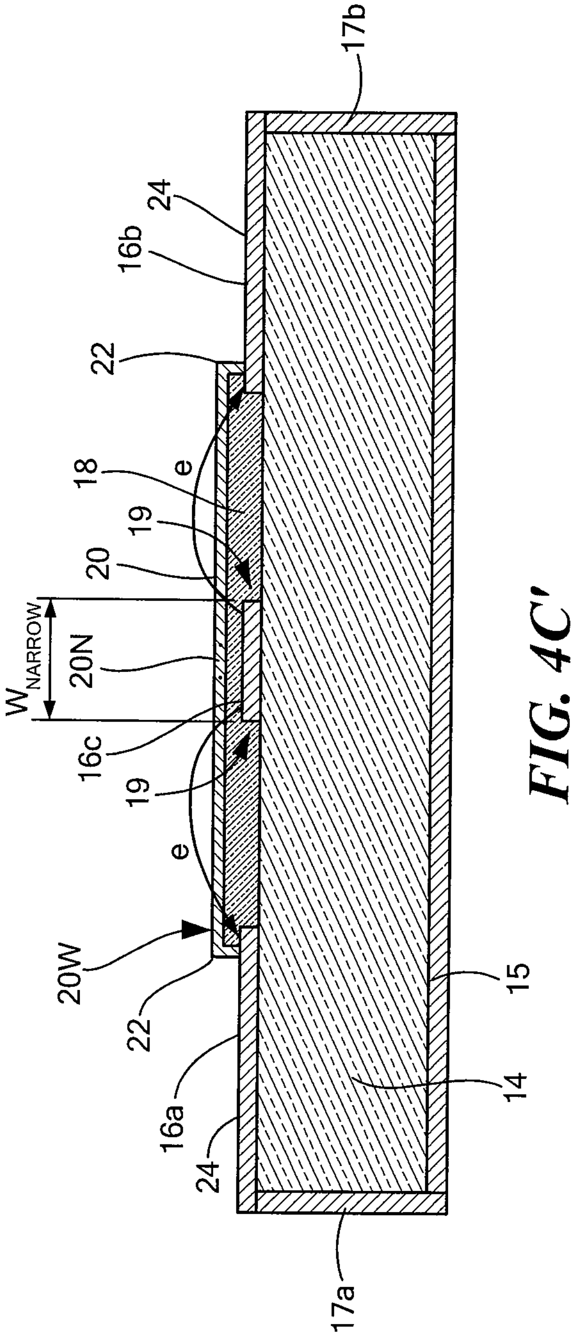
Figure 5A:
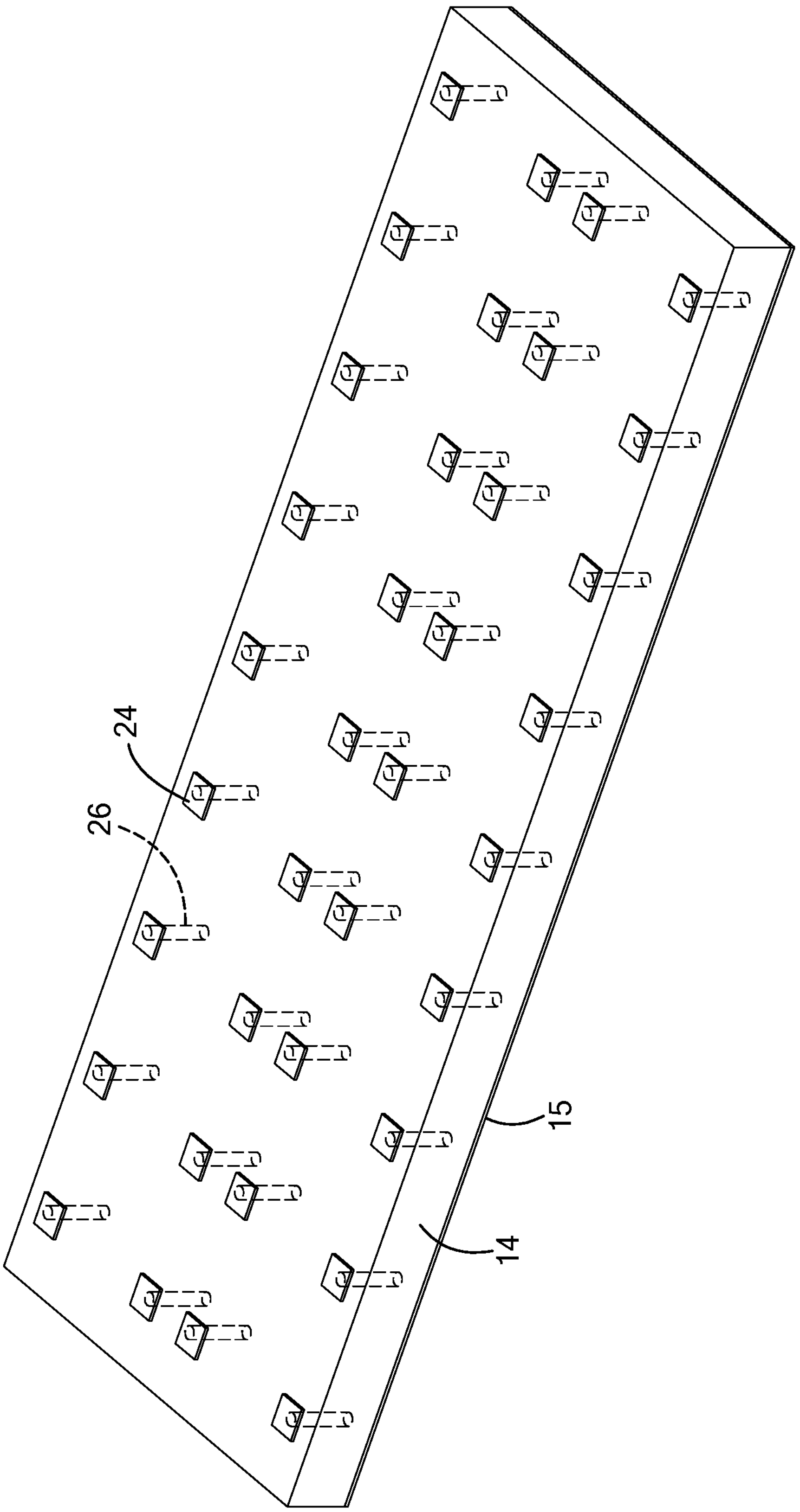
FIGS. 5A-5D are perspective view sketches of the pair of microstrip transmission line sections of FIG. 3 at various stages in the fabrication thereof according to the disclosure.
Figure 5B:
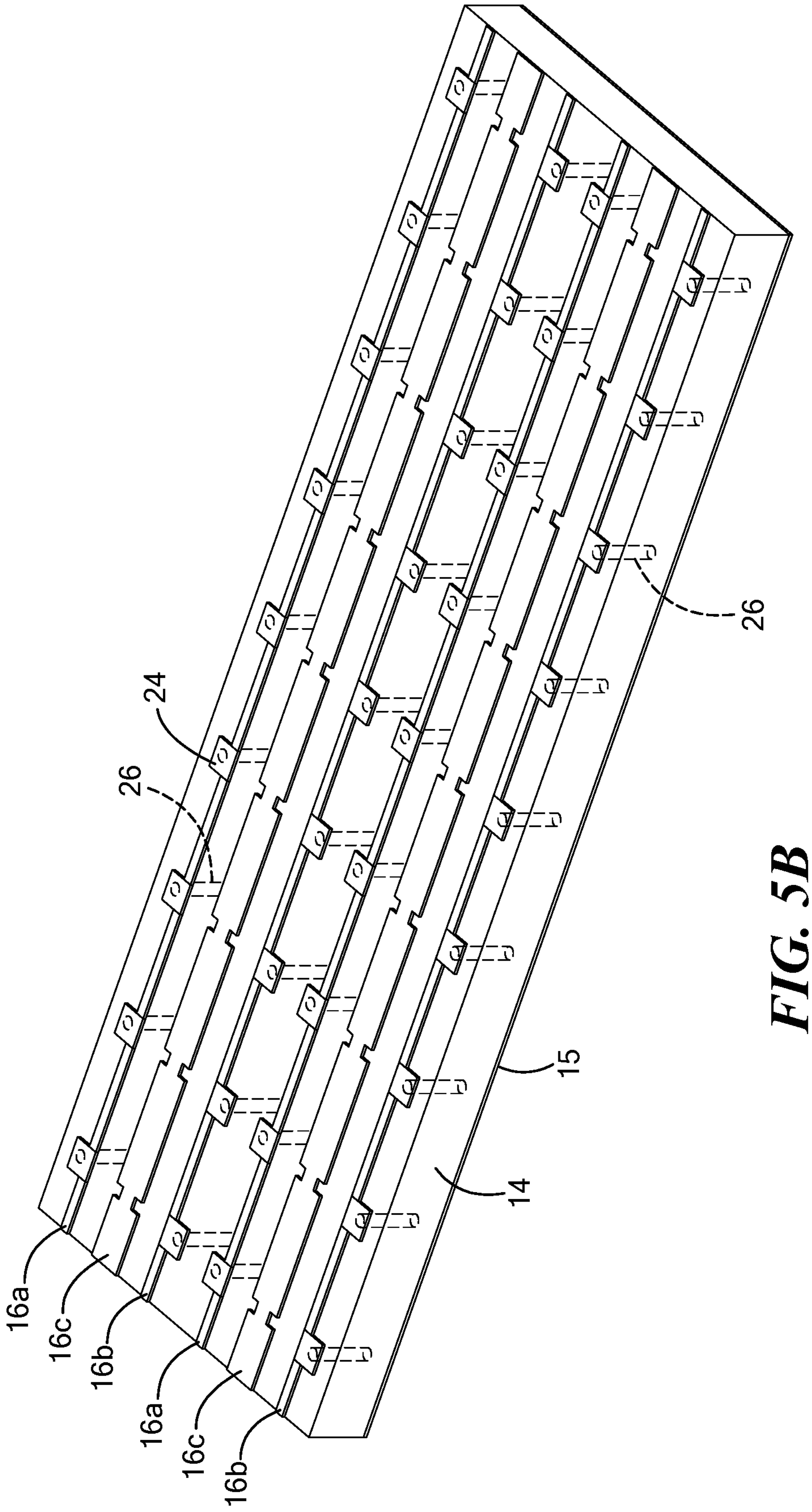
Figure 5C:
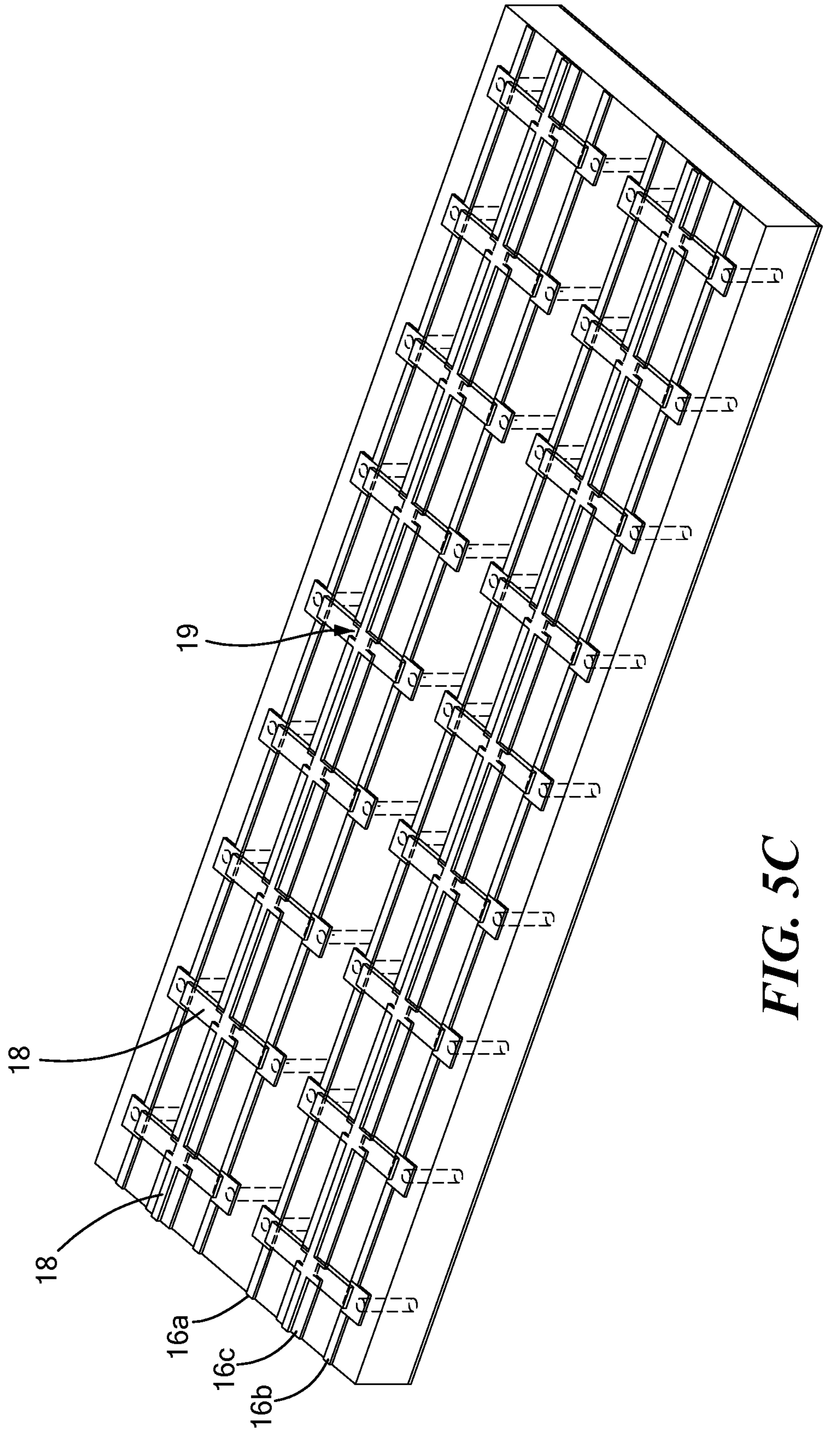
Figure 5D:
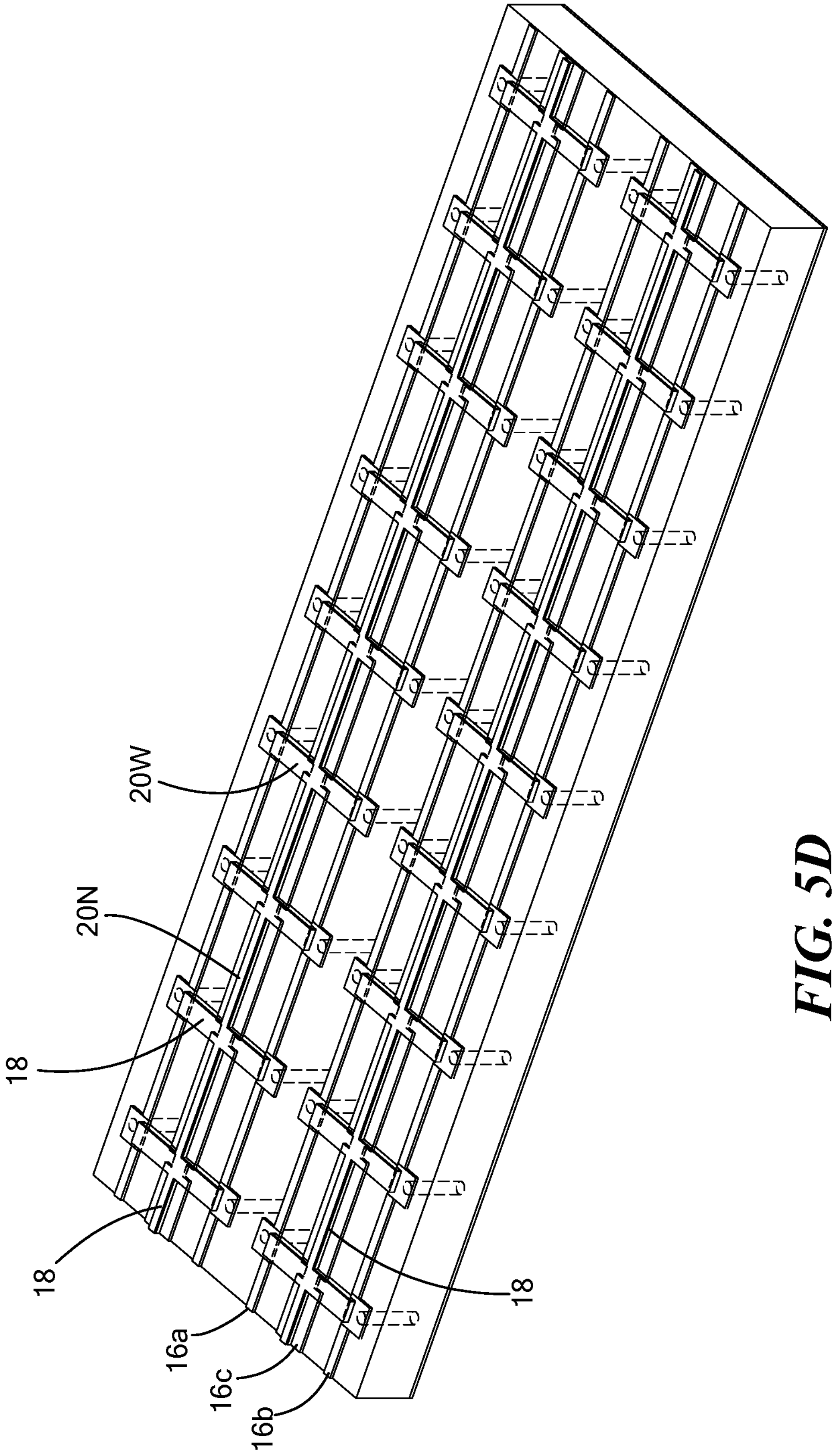

Next, referring to FIGS. 5C and 5D, the solid dielectric layer 18 is formed, here for example by printing a dielectric material, here for example, epoxy based dielectric ink product designation 118-12 from Creative Materials Inc., 12 Willow Road, Ayer, Mass. 01432, on the signal strip conductor 16*c*, over the portions of the upper surface of the dielectric substrate structure 14 between the ground strip conductors 16*a*, 16*b* and signal strip conductor 16*c* (including the portion of the surface exposed by the notch 19 (FIG. 5C) in the sidewalls of the signal strip conductor 16*c*), and here, for example, over a small, inner surface portion of the ground strip conductors 16*a*, 16*b*, as shown in FIGS. 4C and 4D It should be understood that the solid dielectric layer 18 may be the same width as the width of the signal strip conductor 16*c* portion the solid dielectric layer 18 is covering.

After the printed dielectric material is cured to form the solid dielectric layer 18, an electrically conductive ink, here for example, Paru nanosilver PG-007, is used to form the electrically conductive shield 20 (portions 20W and 20N), as shown in FIG. 5D and as described above in connection with FIGS. 4A-4E.

Figure 6A:
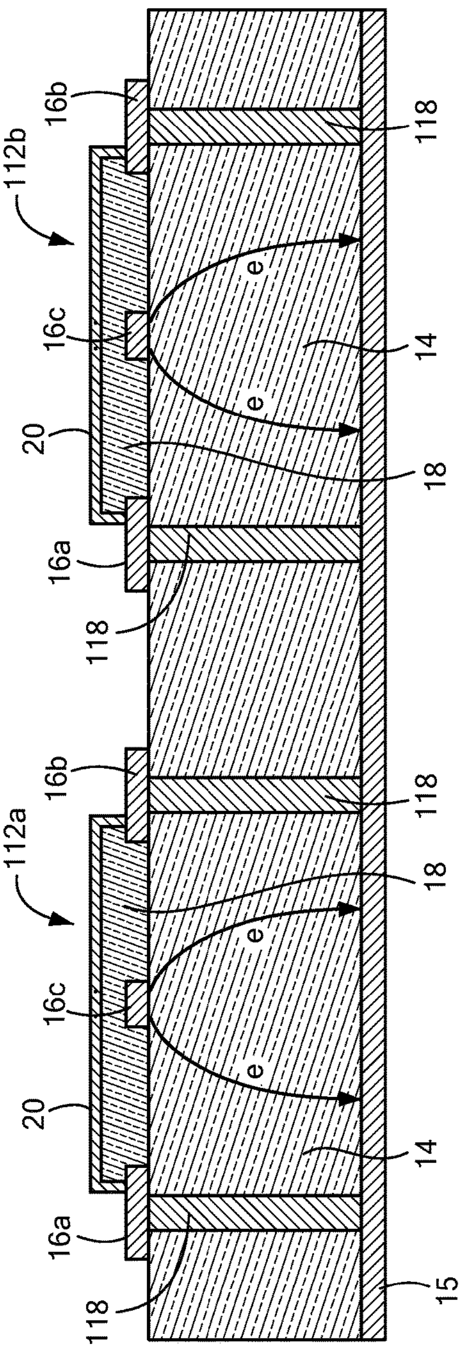
FIG. 6A is a cross-sectional sketch of an exemplary one of a plurality of serially connected sections of one of the pair of microstrip microwave transmission sections of FIG. 5D according to the disclosure.
Figure 6B:
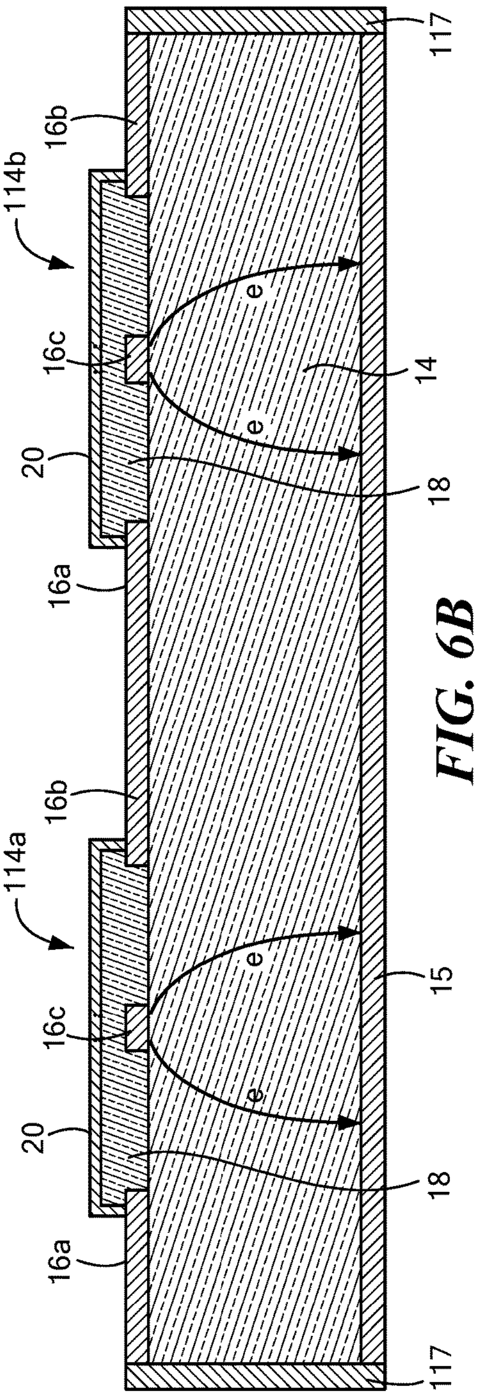
FIG. 6B is a cross-sectional sketch of an exemplary one of a plurality serially connected sections of one of the pair of microstrip microwave transmission line sections of FIG. 5D according to another embodiment of the disclosure.
Figure 6C:
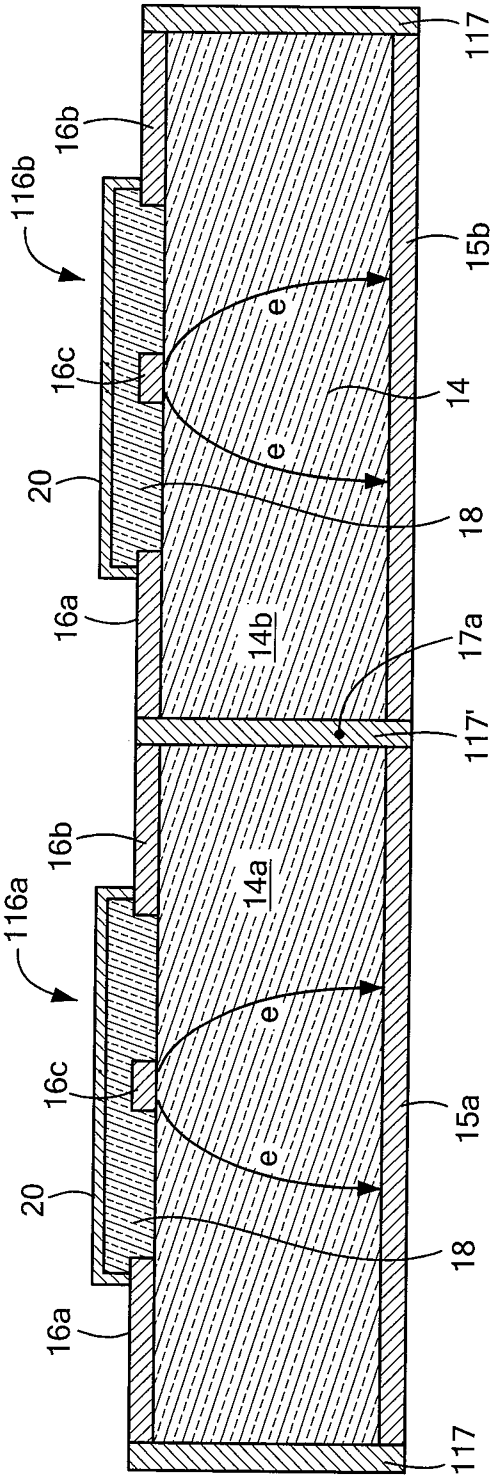
FIG. 6C is a cross-sectional sketch of an exemplary one of a plurality of serially connected sections of one of the pair of microstrip microwave transmission line structures of FIG. 5D according to the still another embodiment of the disclosure.

Referring now to FIG. 6A, another embodiment is shown. Here, a portion of a pair of microstrip microwave transmission line structure sections 112*a*, 112*b* is shown; it being noted that the electric field (e) is through the substrate 14 between the signal strip conductor 16*c* and the ground plane conductor 15. Each one of the sections 112*a*, 112*b* includes a pair of ground strip conductors 16*a*, 16*b* is disposed on a surface of a dielectric substrate structure 14; a signal strip conductor 16*c* disposed on the surface of the dielectric substrate structure 14 between the pair of ground strip conductors 16*a*, 16*b*; a solid dielectric layer 18 disposed over: the signal strip conductor 16*c*; the upper surface of the dielectric substrate structure 18 between sides of each one of the ground strip conductors 16*a*, 16*b* and the signal strip conductor 16*c*; and an electrically conductive shield member 20 disposed on the solid dielectric layer 18 and on, and in direct contact with, upper surfaces of the pair of ground strip conductors 16*a*, 16*b*. The ground plane conductor 15 is disposed on a bottom surface of the dielectric substrate structure 14 and the electrically conductive shield member 20 is electrically connected to the ground plane conductor 15. The solid dielectric layer 18 has outer sides disposed over the upper surfaces of the pair of ground strip conductors 16*a*, 16*b* and wherein the electrically conductive shield member 20 is disposed on the outer sides of the solid dielectric layer 18. It is noted that in the embodiment show in FIG. 6A, electrically conductive vias 118 are used to connect the ground strip conductors 16*a*, 16*b* to the ground plane conductor 15; whereas in FIG. 6B electric conductor 117 are formed on the outer sides of substrate structure 14 to connect the ground strip conductors 16*a*, 16*b* to the ground plane conductor. 15. It is noted that in the embodiment of FIG. 6B, one ground strip conductor 16*b* of one of the pair microstrip microwave transmission line structures sections 114*a* is connected to one ground strip conductor 16*a* of the other one of the pair microstrip microwave transmission line structures sections 114*b*. In an embodiment shown in FIG. 6C here two substrates 14*a*, 14*b*, each with a corresponding one of the pair microstrip microwave transmission line structure sections 116*a*, 116*b* are bonded together; it being noted that an electrical conductive layer 117' on the outer sides of at least one of the pair microstrip microwave transmission line structure sections 116*a*, 116*b* provides a vertical ground connected structure passing between the ground strip conductor 16*b* of section 116*a* and the ground strip conductor 16*b* of section 116*b* to the ground plane conductors 15*a*, 15*b* to further electrically isolated the pair microstrip microwave transmission line structures sections 116*a*, 116*b*.

Figure 7:
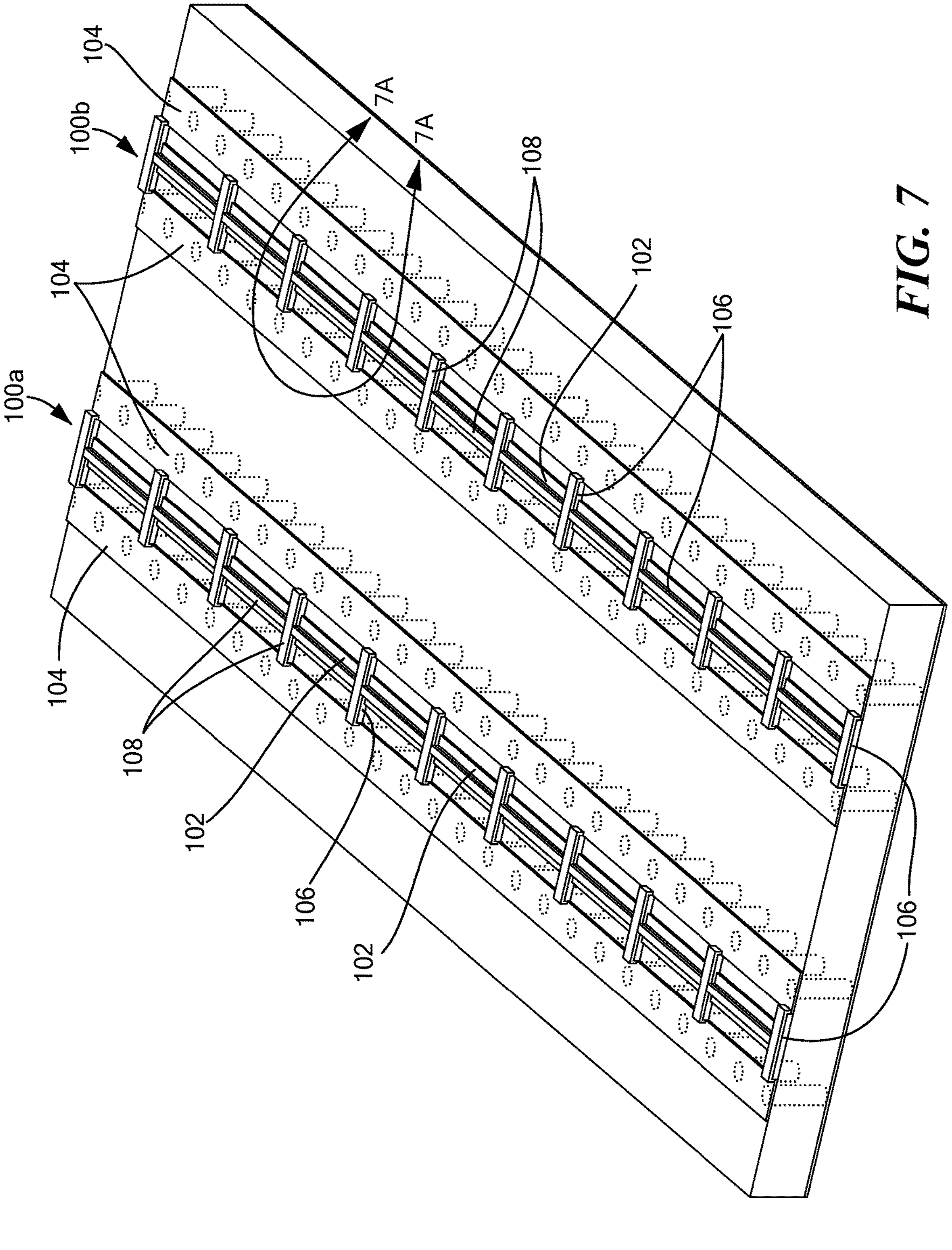
FIG. 7 is a perspective view sketch of a pair of CPW transmission line structures electrically isolated one from the other according to the disclosure.
Figure 7A:
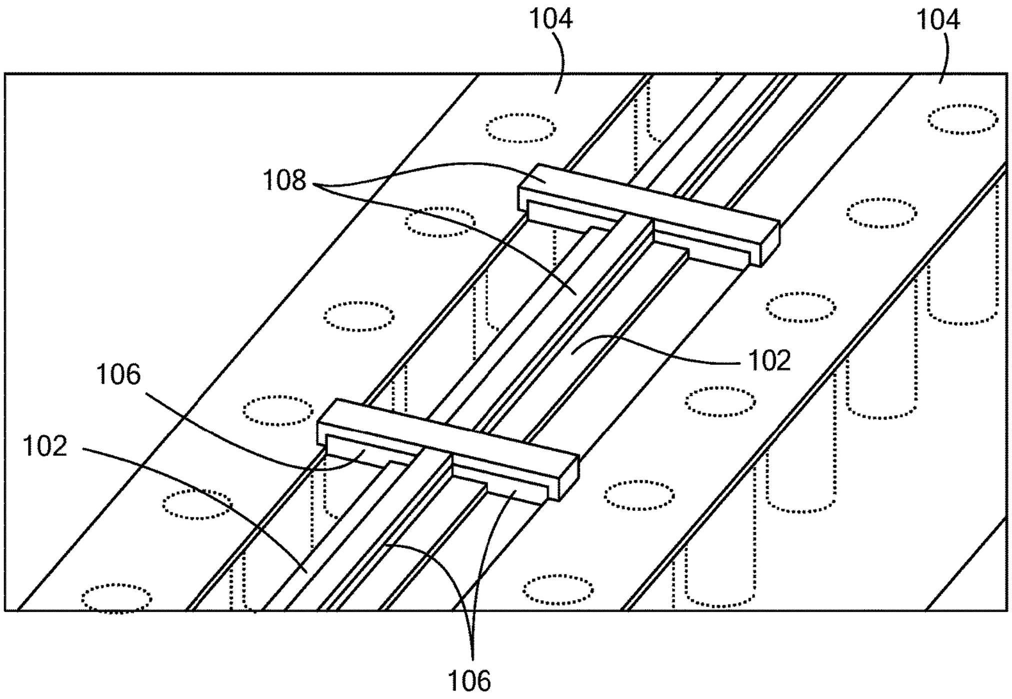
FIG. 7A is an enlarged, perspective view sketch of a portion of one of the pair of CPW transmission line structures of FIG. 7, such portion being enclosed by the arrow 7A-7A in FIG. 7.

A number of embodiments of the disclosure have been described. Nevertheless, it will be understood that various modifications may be made without departing from the spirit and scope of the disclosure. For example, referring to FIGS. 7 and 7A, the process described above may be applied to Coplanar Waveguide (CPW) transmission line structures. Thus, a pair of CPW transmission line structures 100*a*, 100*b* (FIG. 7) each having: signal strip conductor 102 disposed between a pair of ground plane conductor 104; a dielectric layer 106 over the signal strip conductor 102; and an electrical conductor covering the signal strip conductors 102 and forming the electrical conductive shields 108 over the dielectric layer 106 and on the pair of ground plane conductor 104 as shown. Accordingly, other embodiments are within the scope of the following claims.

What is claimed is:

1. A microwave transmission line structure, comprising;

a pair of ground strip conductors on a surface of a dielectric substrate structure;

a signal strip conductor disposed on the surface of the dielectric substrate structure between the pair of ground strip conductors;

a dielectric disposed over: the signal strip conductor; and the surface of the dielectric substrate structure between the pair of ground strip conductors;

an electrically conductive shield member disposed over the dielectric and having a first portion on, and in direct contact with, upper surfaces of the pair of ground strip conductors and a second portion disposed vertically over the signal strip conductor; and wherein the signal strip conductor has a notch in a side thereof, such notch being disposed under the electrically conductive shield member.

2. The microwave transmission line structure recited in claim 1 wherein the second portion of the electrically conductive shield member is disposed over and covers a first portion of the signal strip conductor, a second portion of the signal strip conductor being uncovered by the electrically conductive shield member.

3. The microwave transmission line structure recited in claim 1 including:

a ground plane conductor disposed on a bottom surface of the dielectric substrate structure; and wherein the electrically conductive shield member is electrically connected to the ground plane conductor.

4. The microwave transmission line structure recited in claim 2 including:

a ground plane conductor disposed on a bottom surface of the dielectric substrate structure; and wherein the electrically conductive shield member is electrically connected to the ground plane conductor.

5. The microwave transmission line structure recited in claim 1 wherein the second portion of the electrically conductive shield member is disposed over a first portion of the signal strip conductor, a second portion of the signal strip conductor being uncovered by the electrically conductive shield member and wherein the first portion of the signal strip conductor has the notch therein, such first portion of the signal strip conductor being narrower than the uncovered portion of the signal strip conductor.

6. A microwave transmission line structure, comprising:

a pair of ground strip conductors on a surface of a dielectric substrate structure;

a signal strip conductor disposed on the surface of the dielectric substrate structure between the pair of ground strip conductors;

a dielectric disposed over: the signal strip conductor; and the surface of the dielectric substrate structure between sides of each one of the ground strip conductors;

an electrically conductive shield member disposed along the microwave transmission line structure, the electrically conductive shield member having: a first portion being disposed on, and in direct contact with, upper surfaces of the pair of ground strip conductors; and a second portion disposed vertically over the signal strip conductor; and wherein the electrically conductive shield member has wide portions and narrow portions and wherein the wide portions are electrically interconnected with the narrow portions, and;

wherein the narrow portions are disposed over the signal strip conductor.

7. The microwave transmission line structure recited in claim 6 including:

a ground plane conductor disposed on a bottom surface of the dielectric substrate structure; and wherein the electrically conductive shield member is electrically connected to the ground plane conductor.

8. The microwave transmission line structure recited in claim 6 wherein: the wide portions of the electrically conductive shield member are disposed over and cover first portions of the signal strip conductor; and second portions of the signal strip conductor are uncovered by the electrically conductive shield.

9. The microwave transmission line structure recited in claim 8 including:

a ground plane conductor disposed on a bottom surface of the dielectric substrate structure; and wherein the electrically conductive shield member is electrically connected to the ground plane conductor.

10. The microwave transmission line structure recited in claim 6 wherein the solid dielectric layer has outer sides disposed over the upper surfaces of the pair of ground strip conductors and wherein the electrically conductive shield member is disposed on the outer sides of the solid dielectric layer.

11. A microwave transmission line structure, comprising;

a pair of ground strip conductors on a surface of a dielectric substrate structure;

a signal strip conductor disposed on the surface of the dielectric substrate structure between the pair of ground strip conductors;

a dielectric disposed over: the signal strip conductor; and the surface of the dielectric substrate structure between the pair of ground strip conductors;

an electrically conductive shield member disposed on over the dielectric and having a first portion on, and in direct contact with, upper surfaces of the pair of ground strip conductors and a second portion disposed vertically over the signal strip conductor; and wherein the first portion of the electrically conductive shield member bridges an underlying portion of the signal strip conductor and is dielectrically separated from the underlying portion of the signal strip conductor by a portion of the dielectric layer, and wherein the underlying portion of the signal strip conductor is narrower than portions of the signal strip conductor adjacent to the underlying portion of the signal strip conductor.

12. A microwave transmission line structure, comprising;

a pair of ground strip conductors on a surface of a dielectric substrate structure;

a signal strip conductor disposed on the surface of the dielectric substrate structure between the pair of ground strip conductors;

a solid dielectric layer disposed over: the signal strip conductor; and the surface of the dielectric substrate structure between the pair of ground strip conductors;

an electrically conductive shield member disposed over the solid dielectric layer and having a wide portion on, and in direct contact with, upper surfaces of the pair of ground strip conductors and a narrow portion disposed vertically over the signal strip conductor;

and wherein the solid dielectric layer has outer sides disposed over the pair of ground strip conductors and wherein the electrically conductive shield member is disposed on the outer sides of the solid dielectric layer; and wherein the wide portions are electrically interconnected with the narrow portions, and;

wherein the narrow portions are disposed vertically over the signal strip conductor.

13. A microwave transmission line structure, comprising:

a plurality of serially connected microwave transmission line structure sections, each one of the sections comprising:

a pair of ground strip conductors on a surface of a dielectric substrate structure;

a signal strip conductor disposed on the surface of the dielectric substrate structure between the pair of ground strip conductors;

a solid dielectric layer disposed over: the signal strip conductor; and the surface of the dielectric substrate structure between sides of each one of the ground strip conductors;

an electrically conductive shield member disposed on the solid dielectric layer and on, and in direct contact with, upper surfaces of the pair of ground strip conductors;

wherein the electrically conductive shield member is disposed over a first portion of the signal strip conductor, second portions of the signal strip conductor being uncovered by the electrically conductive shield member, the first portion of the signal strip conductor being disposed between the pair of second portions of the signal strip conductor; and wherein the electrically conductive shield member has wide portions and narrow portions and wherein the wide portions are electrically interconnected with the narrow portions, and;

wherein the narrow portions are disposed over portions of the signal strip conductor adjacent to the second, uncovered portions of the strip conductors.

14. The microwave transmission line structure recited in claim 13 wherein the solid dielectric layer has outer sides of each one of the a plurality of serially connected microwave transmission line structure sections is disposed over upper surfaces of the pair of ground strip conductors and wherein the electrically conductive shield member is disposed on the outer sides of the pair of ground plane conductors.

15. The microwave transmission line structure recited in claim 13 wherein each one of the one of the plurality of microwave transmission line structure sections has the same predetermined input impedance.

16. The microwave transmission line structure recited in claim 15 wherein the plurality of microwave transmission line structure sections are spaced at predetermined positions along the microwave transmission line structure.

17. A microwave transmission line structure, comprising;

a pair of ground strip conductors on a surface of a dielectric substrate structure;

a signal strip conductor disposed on the surface of the dielectric substrate structure between the pair of ground strip conductors;

a dielectric layer disposed over: the signal strip conductor; and the surface of the dielectric substrate structure between the pair of ground strip conductors;

an electrically conductive shield member disposed over the dielectric and having a first portion on, and in direct contact with, upper surfaces of the pair of ground strip conductors and a second portion disposed vertically over the signal strip conductor; and wherein the second portion of the electrically conductive shield member is narrower than the signal strip conductor.

18. A microwave transmission line structure, comprising;

a pair of ground strip conductors on a surface of a dielectric substrate structure;

a signal strip conductor disposed on the surface of the dielectric substrate structure between the pair of ground strip conductors;

a dielectric disposed over the signal strip conductor and the pair of ground strip conductors;

an electrically conductive shield member disposed over the dielectric, comprising:

a first portion having:

a first end on, and in direct contact with, upper surfaces of a first one of the pair of ground strip conductors;

a second end on, and in direct contact with, upper surfaces of a second one of the pair of ground strip conductors; and a bridging portion connected between the first end and the second end, the bridging portion being disposed over of a portion the signal strip conductor underlying the bridging portion; and a second portion disposed between, and dielectrically separated by the dielectric from the pair of ground strip conductors, the second portion being disposed longitudinally over, parallel to, and dielectrically separated by the dielectric from, the signal strip conductor, and the second portion being connected to the bridging portion of the electrically conductive shield member.

19. The microwave transmission line structure recited in claim 18 wherein the second portion of electrically conductive shield member is narrower than the signal strip conductor.

20. The microwave transmission line structure recited in claim 19 wherein the underlying portion of the signal strip conductor is narrower than portions of the signal strip conductor that are not under-lying the bridging portions.

21. The microwave transmission line structure recited in claim 18 wherein the first portion is wider than the second portion.

22. A microwave transmission line structure, comprising:

a pair of ground strip conductors disposed longitudinally along a surface of a dielectric substrate structure;

a signal strip conductor disposed longitudinally along the surface of the dielectric substrate structure between the pair of ground strip conductors;

a dielectric disposed over the signal strip conductor and the pair of ground strip conductors;

an electrically conductive shield member, disposed over the dielectric, comprising: a plurality of first portions spaced one from another longitudinally over the surface of the dielectric substrate structure, each one of the plurality of first portions having: a first end on, and in direct contact with, upper surfaces of a first one of the pair of ground strip conductors; a second end on, and in direct contact with, upper surfaces of a second one of the pair of ground strip conductors; and a bridging portion connected between the first end and the second end, the bridging portion being disposed over an underlying portion of the signal strip conductor; and a second portion disposed between, and dielectrically separated by the dielectric from, the pair of ground strip conductors, the second portion being disposed longitudinally over, parallel to, and dielectrically separated by the dielectric from, the signal strip conductor, and the second portion being connected to the bridging portion of each one of the plurality of first portions of the electrically conductive shield member.

23. The microwave transmission line structure recited in claim 22 wherein the plurality of first portions are wider than the second portion.

24. The microwave transmission line structure recited in claim 22 wherein the underlying portion of the signal strip conductor is narrower than portions of the signal strip conductor that are not under-lying the bridging portion.

25. The microwave transmission line structure recited in claim 24 wherein the microwave transmission line structure has the same predetermined input impedance longitudinally along the surface of the substrate.

26. The microwave transmission line structure recited in claim 22 wherein a first strip conductor portion is narrower than a second strip conductor portion.

* * * * *